United States Patent [19]
Barkan

[11] 3,842,187
[45] Oct. 15, 1974

[54] ELECTRIC BUS WITH JOINT FOR ACCOMMODATING EARTHQUAKE-PRODUCED MOTION OF PARTS

[75] Inventor: Philip Barkan, Media, Pa.

[73] Assignee: General Electric Company, Philadelphia, Pa.

[22] Filed: Nov. 28, 1973

[21] Appl. No.: 419,849

[52] U.S. Cl................... 174/38, 174/13, 174/21 C, 174/73 R, 174/86, 174/99 E, 285/227, 339/7, 339/9 E, 403/56, 403/59, 403/182, 403/287
[51] Int. Cl. ...................... H02g 15/24, H02g 5/00
[58] Field of Search ..... 174/12 R, 13, 21 R, 21 CA, 174/22 C, 37, 38, 70 B, 71 B, 73 R, 86, 88 B, 99 B, 99 E, 100; 317/103; 339/2 R, 7, 9 R, 9 E, 64 R, 64 M, 255 R, 255 P; 285/133 R, 134, 135, 165, 166, 224, 227, 299, 300; 403/50, 51, 56, 59, 180, 182, 287

[56] References Cited
UNITED STATES PATENTS

| | | | |
|---|---|---|---|
| 396,908 | 1/1889 | Wiseman | 285/165 |
| 1,531,917 | 3/1925 | French | 317/103 X |
| 1,966,234 | 7/1934 | Cox et al. | 317/103 X |
| 2,044,580 | 6/1936 | Leach | 174/21 CA UX |
| 2,656,201 | 10/1953 | Swerdlow et al. | 285/165 |
| 2,872,659 | 2/1959 | Wills | 339/64 R X |
| 2,999,998 | 9/1961 | Cole | 339/64 R |
| 3,713,075 | 1/1973 | Clark | 339/64 R |
| 3,767,840 | 10/1973 | Cronin et al. | 174/13 X |
| 3,783,431 | 1/1974 | Badey et al. | 339/2 R |

FOREIGN PATENTS OR APPLICATIONS

| | | | |
|---|---|---|---|
| 1,922,433 | 11/1970 | Germany | 174/22 C |
| 397,539 | 8/1933 | Great Britain | 174/13 |
| 25,937 | 8/1970 | Japan | 339/64 R |

*Primary Examiner*—Laramie E. Askin
*Attorney, Agent, or Firm*—William Freedman; J. Wesley Haubner

[57] ABSTRACT

An electric bus comprises a pair of adjacent bus portions, each comprising a tubular sheath and a conductor within the sheath spaced and electrically insulated from the sheath. A current-carrying joint electrically connects the conductors in series and comprises: (a) two spaced-apart ball and socket connections electrically connected in series with each other, and (b) a sliding connection electrically in series with the ball and socket connections for allowing relative movement between the conductors in a direction longitudinally thereof. A tubular enclosure for the joint is radially spaced therefrom, is joined to the sheaths at its opposite ends, and is constructed to allow for axial, transverse, and rotational movement of the sheaths with respect to each other.

6 Claims, 4 Drawing Figures

ELECTRIC BUS WITH JOINT FOR ACCOMMODATING EARTHQUAKE-PRODUCED MOTION OF PARTS

BACKGROUND

This invention relates to a gas-insulated electric bus and, more particularly, relates to a joint for coupling together two series-connected portions of the bus in such a way as to accommodate all types of relative motion between the two portions that might occur during a severe earthquake.

Of interest with respect to this invention are: U.S. Pat. No. 2,656,201-Swerdlow et al.; No. 3,361,870-Whitehead; and Application Ser. No. 240,493-Badey et al., filed Apr. 3, 1972 now U.S. Pat. 3,783,431, and assigned to the assignee of the present invention.

In a gas-insulated electric bus, two adjacent series-connected portions of the bus may be mounted on separate foundations. If an earthquake should occur at the site of the bus, substantial amounts of relative motion are possible between the foundations and, hence, between the adjacent series-connected portions of the bus. Unless this relative motion can be accommodated without imposing heavy loads on the bus portions, the bus is likely to be damaged by the earthquake. Also, unless this relative motion can be accommodated without substantially reducing the electrical clearances present in the bus, there is an increased possibility of an electrical breakdown across the clearance spaces. This possibility will be further increased if the relative motion causes any loose particles to be introduced into highly-stressed spaces within the bus or causes any significant leakage of the gas in the bus.

SUMMARY

Accordingly, a general object of my invention is to provide between adjacent series-connected portions of a gas-insulated electric bus a joint that is capable of safely accommodating all types of relative motion between said portions which might occur during a severe earthquake.

Another object is to accommodate such relative motion without allowing the bus to be mechanically damaged by the motion, without allowing the electrical clearances therein to be materially reduced by the motion, and without introducing loose particles into electrically highly-stressed regions of the bus.

In carrying out the invention in one form, I provide an electric bus comprising a pair of adjacent bus portions, each comprising a tubular metal sheath and a conductor within the sheath extending longitudinally thereof in spaced, electrically-insulated relationship with respect to the sheath. For electrically connecting the conductors in series, there is provided a current-carrying joint comprising: (a) two current-carrying ball and socket connections electrically connected in series with each other, and (b) a sliding connection electrically in series with the ball and socket connections for allowing relative movement between the conductors in a direction longitudinally thereof. Each ball and socket connection comprises a conductive ball part, a conductive socket part defining a socket for receiving said ball part in a manner that permits relative angular movement between said parts. One of said parts comprises a plurality of segments and means for biasing said segments into firm engagement with the other part. A tubular enclosure for the joint is radially spaced therefrom and interconnects said tubular sheaths. The enclosure is constructed to allow for axial, transverse, and rotational movement of said sheaths with respect to each other.

BRIEF DESCRIPTION OF DRAWINGS

For a better understanding of the invention, reference may be had to the following description taken in connection with the accompanying drawings, wherein.

DETAILED DESCRIPTION OF PREFERRED EMBODIMENTS

Figure 1:
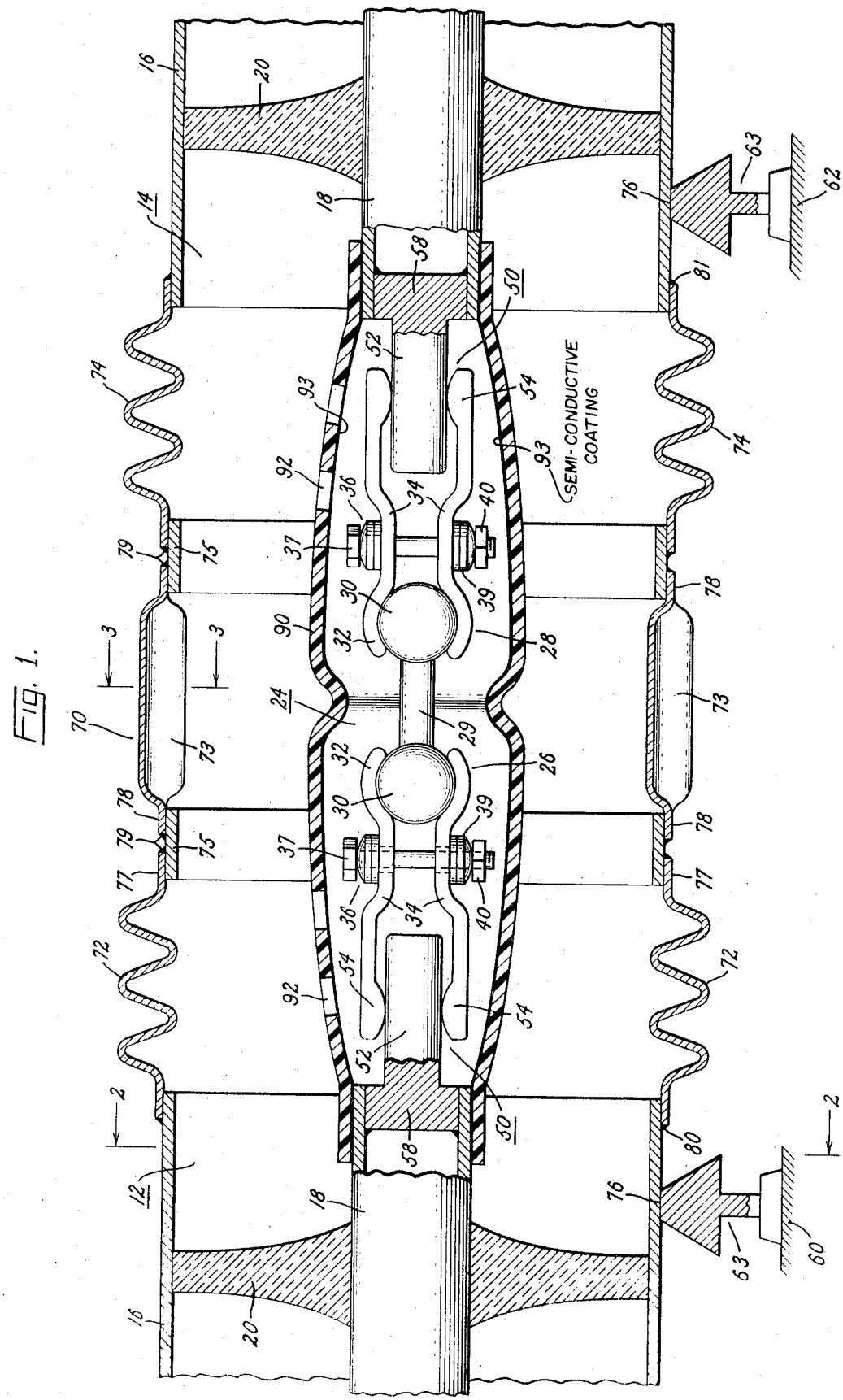
FIG. 1 is a side elevational view, primarily in section, showing an isolated-phase electric bus embodying one form of the invention.
Figure 2:
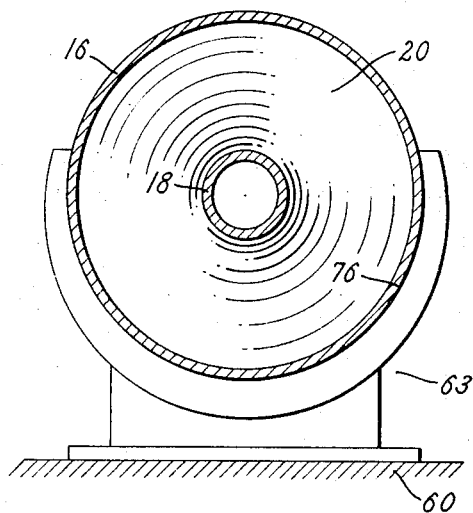
FIG. 2 is a sectional view along the line 2—2 of FIG. 1.

Referring now to FIG. 1, the isolated-phase bus shown therein comprises two adjacent bus portions 12 and 14. Each bus portion comprises a tubular metal sheath 16 at ground potential and conductor 18 at a relatively high potential extending longitudinally of the tubular sheath. In each bus portion, the conductor 18 is supported on its associated sheath by means of electrical insulators, such as the annular insulators 20. The insulators hold the conductor in a central position within the sheath, where it is radially spaced from and electrically isolated from the sheath. In a preferred form of the invention, the space between the conductor 18 and the sheath 16 is filled with a pressurized insulating gas in order to increase the dielectric strength between the conductor and the sheath.

For carrying electrical current between the conductors 18, a current-carrying joint 24 is provided. This joint 24 comprises two ball and socket connections 26 and 28 that are electrically connected in series with each other by a conductive rod 29. Each ball and socket connection comprises a conductive ball member 30 integrally connected with rod 29 and a socket assembly 32 defining a socket for receiving the ball member. The socket assembly 32 comprises a pair of socket segments 34 and spring means 36 biasing the socket segments 34 into firm engagement with the ball member 30.

Each spring means 36 comprises a bolt 37 extending through aligned openings in the two socket segments 34 and suitable resilient washers 39 surrounding the shank of the bolt. A nut 40 on the end of each bolt, when tightened, compresses the washers on the bolt and causes the washers to develop a biasing force on the socket segments 34 that urges their ends into high-pressure engagement with the ball member 30. The ball member 30 is free to move angularly with respect to the socket assembly 32 while the spring means 36 maintains firm engagement between these members 30 and 32.

Between each ball and socket connection and the bus portion 18 there is a sliding connection 50 electrically in series with the ball and socket connection. This sliding connection 50 allows for relative movement between the conductors 18 in a direction longitudinally thereof. Each sliding connection 50 comprises a centrally located plug member 52 and the end portions 54 of socket segments 34 opposite to those end portions which engage ball 30. The end portions 54 are biased by spring means 36 into high pressure engagement with plug 52 at opposite sides of the plug. Preferably, the opposite sides of the plug 52 have planar faces which are engaged by the socket segments 34. If one conductor 18 should shift relative to the other in a direction longitudinal of the conductors, the end portions 54 will simply slide along the outer surfaces of the plug 52 while remaining in high pressure engagement with these outer surfaces.

Each plug 52 is supported on and electrically connected to its associated conductor 18 by means of a body portion 58 on one end of the plug. The body portion 58 fits within tubular conductor 18 and is suitably joined thereto, as by welding.

In the illustrated embodiment, the two bus portions 12 and 14 are mounted on separate foundations 60 and 62 by means of separate cradle structures 63 (soon to be described) positioned between the foundations and the sheaths 16. If an earthquake should occur at the site of the bus, substantial amounts of relative movement are possible between the foundations and, hence, between the bus portions 12 and 14. Such relative movement between the bus portions 12 and 14 can produce relative movement, rotation plus translation in all three axes, between the two conductors 18 and between the two sheaths 16.

The above-described joint 24 is capable of accommodating any such relative movement between the conductors 18 irrespective of the direction in which it might occur. Should the relative movement be in a direction longitudinal of the conductors 18, it can be accommodated by either or both of the sliding joints 50, as already described herein. Should the relative movement be in a direction transversely of the longitudinal axis of the bus, it can be accommodated by relative angular motion of the ball and socket parts within the two ball and socket joints 26 and 28. The presence of two ball and socket joints makes it possible to accommodate such transverse relative movement even though the longitudinal axes of the two conductors 18 remain substantially parallel. (This latter type of relative motion is referred to herein as shear motion.) Any combination of longitudinal and transverse motion or rotation about an axis transverse to the longitudinal axis of the conductors 18 can be accommodated by relative motion at both the sliding joints and the ball and socket joints. Relative rotational motion about the longitudinal axis of the conductors 18 can be accommodated by the ball and socket joints inasmuch as each ball can be rotated relative to its socket about a longitudinal axis.

For accommodating the above-described relative motion between the sheath sections 16, I join the sheath sections together with a tubular metal enclosure 70. This enclosure 70 comprises three distinct sections 72, 73, and 74, all normally disposed in substantially colinear relationship. Each of the sections 72 and 74 is in the form of a conventional metal bellows having annular corrugations extending therearound that permit the bellows to flex longitudinally and in a bending mode. These bellows, by appropriate flexing, are capable of accommodating relative motion between the sheath sections 16 in a direction longitudinal of the bus, in a direction transverse of the bus, in a rotational direction about any axis transverse to longitudinal axis of the bus, and in any combination of these directions.

Section 74 of the enclosure 70 is a tubular part with corrugations extending longitudinally thereof. These corrugations permit section 74 to yield in response to torsional or twisting forces applied to its opposite ends, i.e., one end can rotate through moderate amounts of angular travel with respect to the other. This ability to yield in response to torsional forces permits moderate amounts of relative rotational movement between sheath section 16. Thus, the three sections 72, 73, and 74, working together, can accommodate any type of relative movement (longitudinal, transverse, or rotational) that might occur between the sheath sections 16.

Each of the flexible sections 72, 73, and 74 has a pair of tubular extensions at its opposite ends. The juxtaposed tubular extensions 77 and 78 of sections 72 and 73 surround a tubular sleeve 75 and are joined thereto by suitable welds 79 extending about the entire periphery of the sleeve 75. An identical joint is present between the sections 73 and 74. The tubular extensions located at the outer ends of the bellows 72 and 74 surround the sheath sections 16 and are joined thereto by suitable welds 80 and 81 around the entire periphery of the sheath sections. The above described peripheral weld joints remain intact despite substantial amounts of flexing of the sections 72, 73, and 74, thus permitting substantial shifting of the sheath sections without developing leaks in the sheath. The flexible sections 72, 73, and 74 themselves are imperforate and remain so despite substantial amounts of flexing, thus maintaining the sheath free of leaks despite substantial relative shifting of the bus sections 12 and 14.

Figure 3:
FIG. 3 is a sectional view on a reduced scale taken along the line 3—3 of FIG. 1.

To limit the amount of relative rotational movement between the sheath sections about the longitudinal axis of the bus that is required to be accommodated by the enclosure 70, I construct each of the cradles 63 in such a way that it allows the sheath section supported thereon to rotate with respect to the foundation should any shifting of the foundation occur that tends to produce such rotation. As will be apparent from FIG. 3, the cradle has an arcuate inner surface 76 conforming to the circular outer surface of the sheath 16. The outer surface of the sheath 16 simply rests on this arcuate inner surface and is not attached to it, thus allowing the sheath to rotate relative to the cradle should the need arise. Typically, two cradles, each corresponding to cradle 63, will be provided at spaced points along the length of each bus portion to provide complete support for the associated sheath.

For trapping any loose particles that might be detached from the joint 24 as a result of rubbing or sliding between its relatively movable parts, a sleeve 90 is provided around the joint 24. Sleeve 90 is preferably of a flexible insulating material and is suitably joined at its opposite ends to the conductors 18. In the upper region of the sleeve, suitable holes 92 are provided to afford free communication between the space internal and that external to the sleeve, thus preventing any pressure differential from developing between these spaces. These holes also help to reduce heat buildup in the internal space.

For electrostatically shielding the parts of the joint 24 in order to prevent electric stress concentrations around its sharp corners and projections, a coating 93 of semiconductive material is provided on the internal surface of the sleeve 90. This coating is electrically connected to conductors 18 and is therefore at the same potential as the conductors 18 and the various parts of joint 24. Since the coating is relatively smooth and free of sharp corners and projections, the electric stress concentrations external thereto are reduced. Substantially no electrical stresses are present internally of the sleeve 90 since the coating 93 and the parts of joint 24 are at the same potential. The semiconductive character of coating 93 minimizes the current flowing therethrough between conductor sections 18.

Should the bus portions 12 and 14 shift with respect to each other as a result of an earthquake or the like, the joint 24 will remain in a central location with respect to the surrounding sheath and will continue to be closely surrounded by sleeve 90, thus preventing any major reductions in electrical clearances as a result of such shifting.

In a modified form of the invention (not shown), the coating 93 is omitted and the sleeve 90 is constructed of a resin filled with conductive or semiconductive particles such as graphite. This construction results in the sleeve being at substantially the same potential as the conductors 18 even though the coating 93 is omitted.

Figure 4:
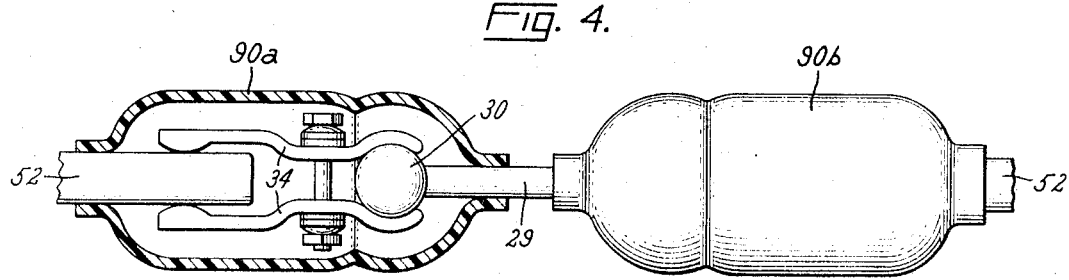
FIG. 4 is a partially sectional view of a modified embodiment.

Although I have shown the sleeve 90 as a single part enclosing the entire joint 24, it is to be understood that two separate sleeves 90a and 90b, each enclosing one of the ball and socket connections and one of the sliding connections 50, could instead be provided, as illustrated in FIG. 4.

Figure 5:
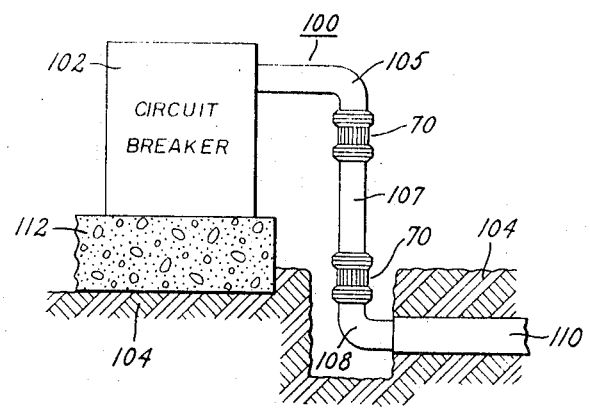
FIG. 5 shows a special application of the invention.

Another application of my invention is illustrated in FIG. 5, where a bus 100 is shown emerging from a circuit breaker 102 and entering a buried underground position in the adjacent soil 104. The bus contains a first horizontal section immediately adjacent the circuit breaker, two elbows 105 and 108, a vertical section 107 extending between the two elbows, and a buried horizontal section 110. The vertical bus section 107 contains two joints, each corresponding to the joint depicted in FIG. 1. The enclosure for each joint is indicated at 70 in FIG. 5. The circuit breaker is mounted on a foundation 112 embedded in the surrounding soil.

Should the foundation 112 move (e.g., in response to an earthquake) in any direction with respect to the soil 104 in which the horizontal bus section 110 is buried, such relative motion can be readily accommodated by the two joints comprising the enclosures 70 without imposing any substantial mechanical stresses on the bus. The joints allow for all types of relative motion in the same manner as pointed out with respect to FIG. 1. A sufficient clearance space is provided between the lower end of vertical bus section 107 and the surrounding soil to avoid any interference with motion at the lower joint.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. An electric bus section comprising:
   a. a pair of adjacent bus portions, each comprising a tubular metal sheath and a conductor within said sheath extending longitudinally of said sheath in spaced, electrically-insulated relationship with respect to said sheath,
   b. a current-carrying joint electrically connecting said conductors in series and comprising:
      i. two current-carrying ball and socket connections electrically connected in series with each other, each comprising a conductive ball part, a conductive socket part defining a socket receiving said ball part in a manner that permits relative angular movement between said parts, said conductive socket part comprising a plurality of segments, and means biasing said segments into firm engagement with said ball part,
      ii. and a sliding connection electrically in series with said ball and socket connections for allowing relative movement between said conductors in a direction longitudinally thereof,
   c. a tubular enclosure for said joint radially spaced therefrom, and means providing a seal between the respective opposite ends of said enclosure and said tubular sheaths, said enclosure being constructed to allow for axial, transverse, and rotational movement of said sheaths with respect to each other.

2. The bus section of claim 1 in which said tubular enclosure comprises:
   a. a pair of tubular flexible bellows, each with annular corrugations to permit axial and transverse movement of said sheaths with respect to each other,
   b. a tubular section having corrugations extending generally longitudinally thereof for permitting relative rotational movement of opposite ends of said tubular section, and
   c. means joining together said tubular bellows and said tubular section in generally colinear relationship with said tubular section located between said tubular bellows.

3. A bus section as constructed in claim 1 and further comprising:
   a. a sleeve of flexible material surrounding said joint and supported at its opposite ends on said conductors,
   b. and a non-insulating coating on a surface of said sleeve at substantially the same potential as said joint for serving as an electrostatic shield for said joint.

4. In combination with the bus section of claim 1,
   a. two separate foundations on which said bus portions are respectively supported, and
   b. mounting means between one of said bus portions and its associated foundation mounting said bus portion on said foundation in such a way as to permit rotational movement of said bus portion relative to said foundation around a longitudinal axis of said one bus portion.

5. The combination of a first generally horizontally-extending bus section, a foundation on which said first bus section is mounted, a second generally horizontally-extending bus section buried in soil near said foundation, a third bus section extending generally vertically between said first and second horizontally-extending bus sections, said third bus section being constructed as defined in claim 1.

6. The combination of a first generally horizontally-extending bus section, a foundation on which said first bus section is mounted, a second generally horizontally-extending bus section buried in soil near said foundation, a third bus section extending generally vertically between said first and second horizontally-extending bus sections, said third bus section comprising two bus sections connected in series and each constructed as defined in claim 1.

* * * * *